US006216579B1

United States Patent
Boos et al.

(10) Patent No.: US 6,216,579 B1
(45) Date of Patent: Apr. 17, 2001

(54) COMPOSITE ARMOR MATERIAL

(75) Inventors: Stephen J. E. Boos, Orleans (CA); Charles A. Williams, Bradenton, FL (US)

(73) Assignee: Her Majesty the Queen in right of Canada, as represented by the Solicitor General acting through the Commissioner of the Royal Mounted Canadian Police

( * ) Notice: Subject to any disclaimer, the term of this patent is extended or adjusted under 35 U.S.C. 154(b) by 0 days.

(21) Appl. No.: 09/172,477

(22) Filed: Oct. 15, 1998

(51) Int. Cl.$^7$ ........................................................ F41H 5/02

(52) U.S. Cl. ........................................ 89/36.02; 89/36.08

(58) Field of Search ................................ 89/36.02, 36.08; 109/49.5

(56) References Cited

U.S. PATENT DOCUMENTS

| 4,131,053 | * | 12/1978 | Ferguson | 89/36 |
| 4,404,889 | * | 9/1983 | Miguel | 89/36 |
| 4,813,334 | * | 3/1989 | Bloks et al. | 89/36.02 |
| 5,290,637 | * | 3/1994 | Sliney | 89/36.02 |

FOREIGN PATENT DOCUMENTS

WO 91/00490 * 1/1991 (WO) ................ F41H/5/04

* cited by examiner

*Primary Examiner*—Michael J. Carone
*Assistant Examiner*—Michelle Thomson
(74) *Attorney, Agent, or Firm*—J. Wayne Anderson

(57) ABSTRACT

The invention disclosed relates to a composite armor material comprising an outer ballistic impact resistant layer of a steel material having a Rockwell "C" scale hardness of 47–54, and an inner blast resistant steel layer having a fracture toughness of 3.6–6.5 J/mm, and a Rockwell "C" scale hardness of 28–36.

9 Claims, 2 Drawing Sheets

COMPOSITE ARMOR MATERIAL

FIELD OF THE INVENTION

This invention relates to a new composite material for use in vehicle armoring.

BACKGROUND OF THE INVENTION

Presently in North America armored vehicles are engineered and manufactured primarily to provide protection against ballistic attack. The armor typically comprises a single plate, and is held in place using mechanical fasteners and/or by welding. Ballistic protection is achieved either by overlapping of several armor plates, or by covering joints with additional plates. From a mechanical strength standpoint, these armor materials are basically parasitic and do not add any significant strength to the vehicle.

More recent advances in armor materials include the use of dual hard steel. The dual property hardness steel armor has several distinct advantages over earlier prior art armor; such advantages include having requirements conducive to unlimited production quantities using existing facilities and having fabricability and intrinsic properties of steel. The earlier concept for dual property steel armor was developed from the knowledge that a high hardness was needed to shatter steel armor piercing projectiles and a high toughness was required to achieve multiple strike integrity.

Although the dual property steel armor principle provides an alloy capable of breaking up the projectile, numerous tested alloys have resulted in panel shattering. When panel shattering occurs the effectiveness of the armor is lost, particularly as an armor suitable for a multiple strike capability.

A further development of armor materials is described in U.S. Pat. No. 3,694,174, which issued on Sep. 26, 1972. That patent discloses a composite material having an outer high hardness impact layer capable of breaking up a projectile, and a lower hardness tough backing layer capable of stopping the broken up projectile. The layers are hot-rolled together to form the composite. The difference in hardness being described as being in the range of 5–8 Rockwell C. The outer layer is further described as having a Rockwell C hardness of 58–59, and the inner layer having a Rockwell C hardness of 52–53. The thickness of the layers is described as being in the range of 2–3.5 inches.

It is apparent that both layers of this material are still relatively hard. Moreover, it is unlikely that the small relative difference in hardness between the two layers would be sufficient to achieve much of a difference in mechanical properties. Further, the hot-rolling process is bound to have an adverse impact upon such properties. Also, a composite of the described dimensions would add considerable weight to a vehicle. It will be appreciated that added weight will affect vehicle performance, particularly the power and handling requirements.

It is also known, for example, from U.S. Pat. No. 4,948,673 issued Aug. 14, 1990, to employ sintered ceramic tiles e.g. based on alumina or silica, to break up armor-piercing projectiles. The broken pieces of the projectile are then stopped by an armor plate backing.

SUMMARY OF THE INVENTION

According to the invention, a novel composite armor material is provided, comprising an outer ballistic impact resistant layer of a steel material having a Rockwell "C" scale hardness of 47–54, and an inner blast resistant steel layer having a fracture toughness of 3.6–6.5 J/mm, and a Rockwell "C" hardness of 28–36.

Optionally, a synthetic resin adhesive is provided between the two layers. Depending upon the requirement, various adhesives may be employed. For example, a soft adhesive such as a polysulfide-based adhesive may be used in some embodiments and a harder adhesive such as a polyurethane-based adhesive may be used in other embodiments.

In another embodiment, a layer of a high tensile strength fabric material is provided adjacent to the inner layer. This layer is not bonded to the inner layer, since bonding would detract from its ballistic capability. Accordingly, it may be touching or slightly spaced from the inner layer and is held in place by mechanical fasteners. Also, in use, some backing space must be provided to permit the material to flex so as to act as a catcher's mitt to trap any shrapnel which may have penetrated the inner layer.

In yet another embodiment, an additional outermost layer is provided, which is of a high hard steel as described above. In this case, no bonder is present, and the steel layers are welded together.

In a further embodiment, a ceramic layer may be included as an additional outermost layer.

DESCRIPTION OF THE PREFERRED EMBODIMENTS

Figure 1:
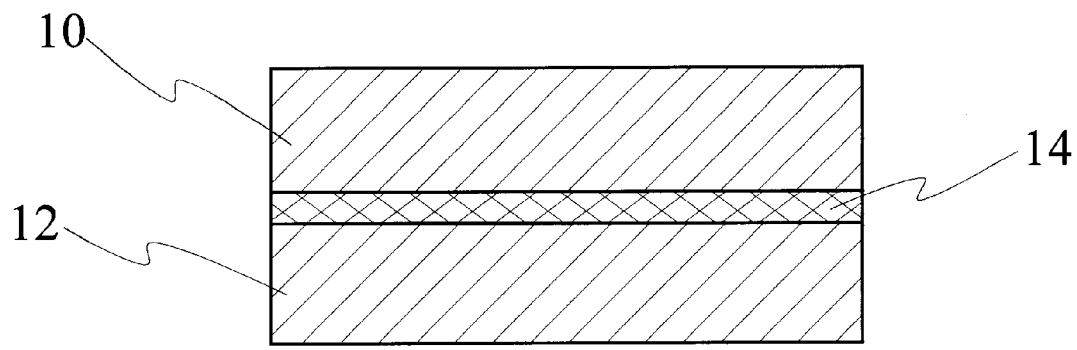
FIGS. 1–4 are side elevations in section of several embodiments of the invention.
Figure 2:
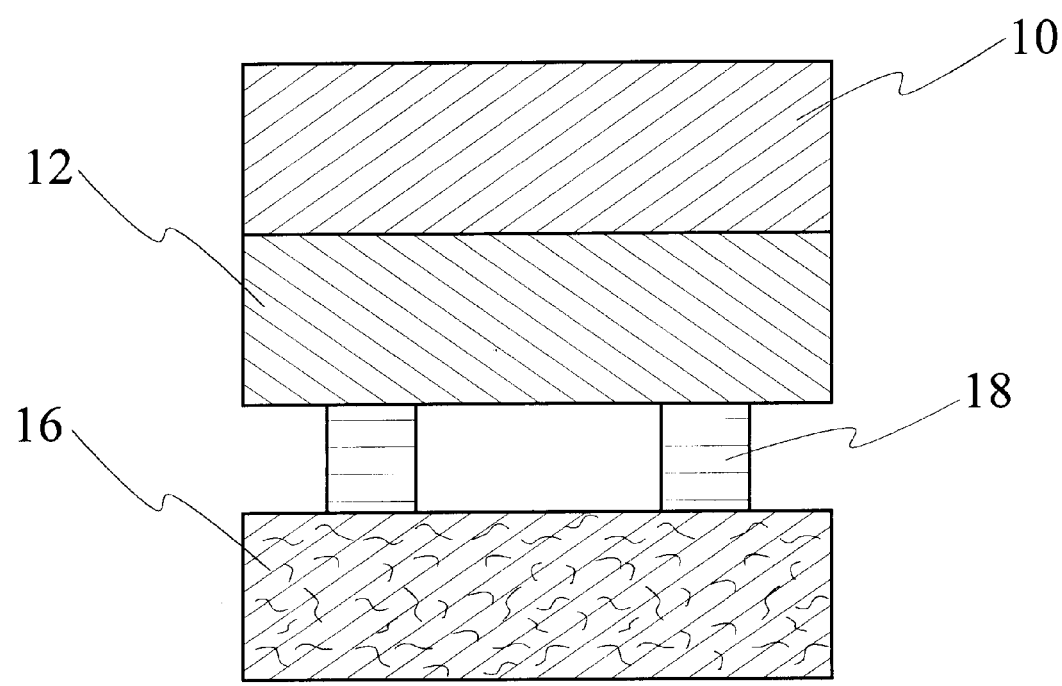
Figure 3:
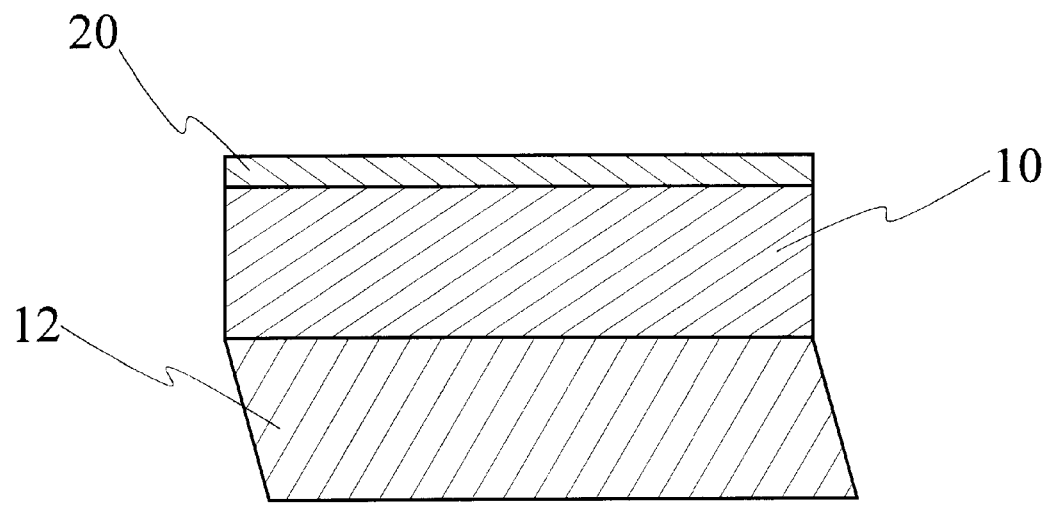
Figure 4:
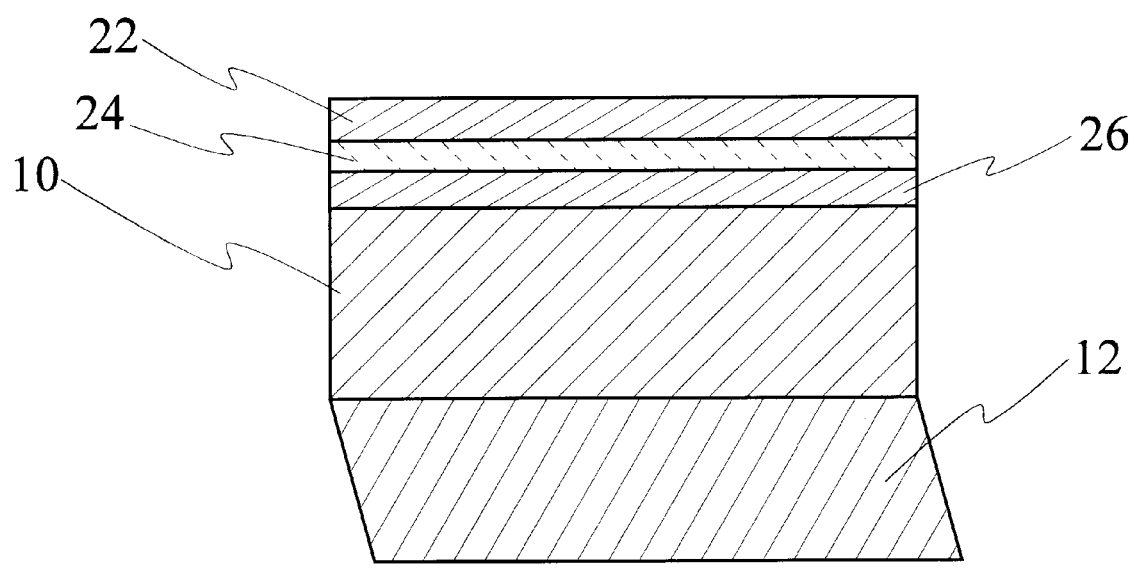

The novel composite armor can be used to protect vehicle doors and roofs. It is comprised of a reasonably hard steel outer layer 10 that is essential so that the lead core bullets and shrapnel meet sufficient resistance to be fundamentally changed or redirected. The subsequent layers can then trap the modified projectile. Yet this outer layer is not so hard that is shatters or fails catastrophically as some ultra high hard steel armors would. A 3 mm thick layer of Bulloy 500 or Compass B555, generally meeting U.S. military specification MIL-A46100D, Armor plate, steel, wrought, high-hardness, has been found to be suitable.

The second layer of steel 12 has been selected specifically for its toughness and ability to elongate a great deal before failure. Generally, these tough steels fall in line with U.S. military specification MIL-1-12560H, Armor plate, steel, wrought, homogenous, Class 2. Its primary role is absorbing great amounts of energy. This layer is also capable of being welded and not losing its mechanical properties as a result. A 3 mm thick layer of Jessup 529 or Sanderson Kayser Class II, has been found to be suitable.

The optional bonding layer 14 of 1–2 mm in thickness, may be a soft adhesive like polysulfide, or a harder adhesive like polyurethane. Specific examples of such adhesives are described in Table 1 which follows.

The big difference shown above is in tensile strength.

The adhesive plays a much greater role than merely holding the plates together. The adhesive distributes the impact energy over a greater area. It reduces the ability of the outer layer of steel to elongate in a direction normal to the applied force. It also adds the shear strength of the inner layer to that of the outer layer. Therefore, instead of allowing the outer layer of steel to fail independently in shear, the adhesive holds the plates together so that some of the shear strength of the inner plate is added to the outer. Thus, the ability of the outer plate to fail in shear or tension is reduced.

This reduces the opportunity for local sites of high stress that are generated at the site of a failure. In addition, the adhesive acts as a medium through which the explosive shock waves must travel. As the waves pass through the outer plate, through the adhesive and then through the inner plate, they meet different levels of impedance. The changes in impedance disturbs the waves and reduces their effect. The net effect of the energy distribution, the combined shear strengths and the shock wave disruption is a reduction in stress experienced by the armour system. This was most apparent when tests 5-1 and 5-3 were conducted. These tests were identical in armour materials, fabrication techniques and test procedures with the exception of the use of an adhesive. Test 5-1 did not have an adhesive between the layers of steel and the resulting depression in the door was 71 mm deep. Test 5-3 had a polysulfide adhesive between the layers of steel and the resulting depression was 57 mm deep. Therefore, it can be seen that the armour systems that employ adhesives between the layers of steel are capable of providing better protection.

The optional inner layer 16, of ballistic material is a composite comprising high tensile fibers laminated together with a ductile polymer binder e.g. Spectrashield®, having an aerial density of about 4.9 Kgm$^2$. This material acts as a catcher's mitt to trap any fragments or pieces of the first two layers of armor that may have become dislodged. Its role is not one of absorbing large amounts of explosive energy but merely dealing with any material that gets through the first two layers, It is this layer that adds significantly to the penetration resistance of the high speed/high hardness shrapnel. The layer 16 is held in place by mechanical.

The mechanical structure is also unique.

The layers of armor are continuous. They are inserted into a vehicle door by cutting the rear face of the door open and inserting them. All other armbr systems use at least two pieces of armor which are fastened together. All of the stress of the shock and overpressure is concentrated at the joint and it fails.

The method of welding the second layer of steel to the hinge pillar plate, the lock pillar plate, the door bottom plate and the beltline bar is unique in that it involves a specific configuration of the welded joints. If one of the welds is over stressed, the crack runs along the weld and out of the structure. Traditionally, armor manufacturers use straight welds which fail causing the armor plates to crack into the plate resulting in catastrophic failure. This system is the subject of our co-pending U.S. application Ser. No. 09/170, 972 filed Oct. 14, 1998.

EXPERIMENTAL RESULTS

Test reports numbered 3E1, 3E3, 3F5, 4-1, 4-2, 4-6, 4-17, 4-18, 4-21, 5-1, 5-2, 5-3 and 5-4 are appended at the end of the application.

In Table 1 which follows entitled "Threats and Systems", we include the test results for various embodiments of our invention.

TABLE 1

| Product | Polysulfide(Thiokol © MC-2326 Class A) | Polyurethane Essex ® U-400SF |
|---|---|---|
| Shore A Hardness | 60 maximum | 55–60 |
| Tensile Strength | >1.38 Mpa | >6.89 Mpa |
| Elongation | >300% | >400% |

The test materials are as follows:

High hard steel=3 mm layer of Sanderson Kayser Bulloy 500 (B500) or Sleeman Compass B555 (B555)

Bonder=1 to 2 mm layer of Essex U-400SF (urethane) or Morton Aerospace Polymer Systems Thiokol® MC™—236 Class A (polysulfide)

Tough steel=3 mm layer of Sanderson Kayser Military Vehicles and Engineering Establishment (MVEE) Class 2 (Class 2) or Jessop 529 (J529)

Spectra=6 mm layer (4.9 kg/m$^2$) of Spectrashield®

Please note that the tests that have been conducted and were successful are noted with their test number, i.e. 3F5 or Yes and they are in bold font. The tests that would pass by extrapolation are in regular font and are identfied by "EX".

Regarding the door armor system, the following convention will be used for the armor configuration:

| System | Location | Materials |
|---|---|---|
| RU | Roof | High hard steel / urethane / tough steel |
| DU | Door | High hard steel / urethane / tough steel / Spectrashield |
| DP | Door | High hard steel / polysulfide / tough steel / Spectrashield |
| DO | Door | High hard steel / no bonder / tough steel / Spectrashield |

The roof system RU was tested and provided protection against the M67 fragmentation grenade and the pipe bomb when they were detonated in contact (refer to tests 4-6, 4-18).

The three door armor systems DU, DP and DO were all tested with the pipe bomb in contact (refer to tests 3F1, 5-3, 5-1). It was found that the Spectrashield was not required to protect against this threat. Therefore, it can be concluded that the roof system would also be effective against the pipe bomb and the M67 grenade (when detonated in contact or close proxinlity) with polysulfide bonder or without any bonder.

Therefore, the armor configurations will be increased to include:

| System | Location | Materials |
|---|---|---|
| RP | Roof | High hard steel / polysulfide / tough steel |
| RO | Roof | High hard steel / no bonder / tough steel |

It was also found that the standard used for high hardness shrapnel, a 9.5 mm diameter steel ball bearing, 63 Rockwell "C" hardness, did not penetrate the two layers of steel in door system DU when faced with the highest threat encountered. This threat was test 3F5. In it the ball bearings were accelerated toward the armor system by a 50 kg. 75% Forcite® dynamite, charge at a distance of 3.0 metres. Thus, the Spectrashield® was not required and the roof armor system would have sufficed.

The roof armor system has been ballistically tested with the same bullets and speed as the door systems but at an angle of forty-five degrees. This is a lower threat.

Accordingly, the roof armor system is good for:

ballistic protection at forty-five degrees,

M67 grenade and pipe bomb protection when detonated in contact and for protection against the 9.5 mm ball bearing accelerated by a 50 kg charge at 3.0 metres.

The addition of the Spectrashield would take the system to a higher standard:
  the roof system protection plus;
  ballistic protection at zero degrees of obliquity,
  fragment protection from pipe bombs at a stand off,
  a 2.3 kg non-directional charge at 0.5 metres and
  a 50 kg nondirectional charge at 3.0 metres.

In some cases, the areas of an armored vehicle that are small in size do not lend themselves to the application of an inner layer of fibrous armor due to the fact that fibrous armor cannot provide protection right to the edge of the fibrous panel. In these areas, such as the roof rails (above the doors and windows but below the roof), useful protection can be achieved from the use of steel armors alone. Accordingly another embodiment of the invention involves an armor system constructed by adding another (outer most) 3 mm layer 20 of high hard steel to the outside of the roof armour system. This three layer steel armour system provided the protection of:
  the roof system plus;
  ballistic protection at zero degrees of obliquity and
  a 50 kg non-directional charge at 3.5 metres (refer to test 4-1).

An even higher standard of protection is provided based on the results of test 4-21. In this test, a ceramic armor panel was placed on the threat side of door system DU A pipe bomb was detonated in contact with the ceramic armor to ascertain whether or not that ceramic would create a fragmentation threat. The system passed.

As per test 4-21, the ceramic applique system consisted of an outer layer 22 of 1.0 mm mild steel, 7.7 mm thick middle layer 24 of Silicon Nitride ceramic tiles 101.6 mm square and an inner layer 26 of 1.0 mm mild steel. The ceramic tiles were arranged in a staggered array and bonded to the outer and inner layers with polyurethane. The overall applique system was 610 mm high and 508 mm wide. It was held against the basic two layer steel armor system described above, with sheet metal screws inserted into the outer door skin.

Therefore, it appears that there are four levels of protection possible built on the same backbone:
  Level 1—Roof armor
  Level 2—Door armor
  Level 3—Roof Rail Armor
  Level 4—Door armor enhanced for higher levels of ballistic protection.

Ballistic Threats

Ballistic testing has taken place for all four door armor and roof rail systems and was successful in stopping the 5.56 mm M193 ball ammunition at muzzle velocity (991+/−8 m/s) at zero degrees of obliquity and the 7.62 mm M60 ball ammunition at muzzle velocity (838+/−8 m/s) at zero degrees of obliquity.

The roof system RU was tested with the same threats but at forty-five degrees. It passed easily and thus by extrapolation the other two roof systems should as well.

Armor piercing ammunition presents a higher ballistic threat. The door armor system DU was subjected to a pipe bomb test when a ceramic applique armor system was attached to the door, test 4-21. This test proved that the ceramics did not degrade the explosive resistance of the door in what is the hardest test. Therefore, it will be apparent to those skilled in the art, that the two other door systems would perform similarly.

Shrapnel

A 9.5 mm diameter steel ball bearing was selected as the standard for shrapnel testing because it is common for a terrorist to encase a non-directional bomb in high hardness shrapnel to enhance the effect of the blast. Usually this shrapnel is in the form of hardened nuts and bolts etc. However, it is extremely difficult to duplicate their impact characteristics in the laboratory because of their shapes. Thus, it was decided to use the ball bearing as the standard as it is relatively easy to propel at desired speeds and trajectories.

The highest threat faced with the ball bearing was the 50 kg non-directional charge at 3.0 metres. In test 3F5 is was shown that the ball bearings would penetrate the outer layer of steel but not the inner layer of steel. Thus, the Spectrashield was not required to defeat this threat. The system tested was the door system DU.

The laboratory tests that were conducted with the ball bearing involved taking the ball bearing up to speeds of 1435 m/s. In these tests involving all three door armor systems, the ball bearings completely penetrated both layers of steel but not the Spectrashield. Therefore, it can be proven by extrapolation that all roof systems and all doors systems could defeat the ball bearing shrapnel threat of 50 kg non-directional charge at 3.0 metres.

The second type of shrapnel threat tested comes from a pipe bomb breaking into pieces at a close distance from the armor system. All three door armor systems were tested with the pipe bomb at a stand off and all three were successful in defeating the threat.

Explosive Device in Contact

The pipe bomb in contact was tested with the roof system RU and all three door systems. What was proven is that only the two layers of steel are required to defeat this threat. Therefore, all roof systems could be used against pipe bombs in contact.

Only roof system RU was tested against the hand grenade in contact, test 4-6. The inner layer of steel was depressed 25.4 mm and the system was far from failing. It would follow that all roof and door systems would defeat this threat as the minimum depression from a pipe bomb in contact was found to be 57 mm, test 5-1, door system DP.

Non-directional Charges

The threat from a bare non-directional charge comes primarily from the shock and over pressure. There were two very high threats that were tested, the 2.3 kg charge at 0.5 metres and the 50 kg charge at 3.0 metres. In both cases the door system DU was tested. In test 3E3 the door was depressed 57 mm by the 2.3 kg charge. The same door was retested with the 50 kg charge in test 3F5 and was found to be depressed 76 mm.

If one considers the fact that the pipe bomb places the greatest amount of stress in a localized area on the door and the pipe bomb depressions for all three door systems are in the same order of magnitude, it would follow that all three door armor systems could handle the 2.3 kg charge at 0.5 metres and the 50 kg charge at 3.0 metres. The only reason door armor systems DP and DO were not tested at these higher threats was merely a resource issue and not a technical issue.

Mechanical Properties

The outer layer of steel was selected for the fact that it was not so hard (ultra high hard, minimum 57 Rockwell "C" scale) that it would shatter and cause catastrophic failure but that it was hard enough (high hard 47–51 Rockwell "C" scale) to fundamentally change or re-direct lead core bullets or shrapnel. Generically, these high hard steels fall in line with the aforementioned U.S. military specification 46100. Mechanical tests were conducted on the steels used as the outer layer and the results are shown in Table 3 tited "Mechanical Test Results". The hardnesses ranged from 47 to 51 Rockwell "C" scale, the ultimate tensile strengths from 1559 to 1688 Mpa, the percent elongation from 13.7 to 19.9 and the fracture toughness from 3.4 to 3.8 J/mm. Preferably, the hardness for this outer layer is 49–51 Rockwell "C" scale.

The inner layer of steel was selected from steels that offer toughness so that the shock of the blast and the impact of shrapnel do not cause these steels to fail. Generically, these tough steels fall in line with U.S. military specification MIL-A-12560H, Armor plate, steel, wrought, homogeneous, Class 2. Mechanical tests were conducted on the steels used as the inner layer and the results are also shown in Table 3. The hardnesses ranged from 30 to 36 Rockwell "C" scale, the ultimate tensile strengths from 980 to 1101 Mpa, the percent elongation from 13.6 to 17.2 and the fracture toughness from 3.8 to 6.5 J/mm. Although the tests were successful with these steels, the preferred steel for this application would be 28–30 Rockwell "C" scale and have a fracture toughness of 5.4–6.5 J/mm. These steels do not lose their mechanical properties as dramatically as the high hard steels when welded and were, therefore, able to be used very effectively as structural members as well as armor plate.

In applications where greater ballistic resistance is required, and the use of ceramic or fibrous armors is impractical or cost prohibitive, a second 3 mm thick outer layer of the high hard steel is included. In this embodiment, the composite comprises three layers of steel, the outer two layers being of the high hard steel and the inner layer being of the high toughness steel materials as described above. The layers are welded together by edge and/or plug welds, with no bonder being present. See Tables 2 and 3 for test data.

TABLE 2

| | | | | | Threats and Systems | | | | |
|---|---|---|---|---|---|---|---|---|---|
| | System: | Roof RU | Roof RP | Roof RO | Door DU | Door DP | Door DO | Roof rail | |
| | Outer layer | High hard steel | High hard steel | High hard steel | High hard steel | High hard steel | High hard steel | High hard steel | |
| | Bonder | Urethane bonder | Polysulphide bonder | No bonder | Urethane bonder | Polysulphide bonder | No bonder | No bonder | |
| | Inner layer | Tough steel | Tough steel | Tough steel | Tough steel | Tough steel | Tough steel | High hard steel | |
| ID | Inmost layer Threat | | | | Spectra | Spectra | Spectra | Tough steel | |
| | | | | | 1. Ballistic | | | | |
| 1.A. | 5.58 mm M193 @ 991 +/− 8 m/s | 45 degrees B555 + J529 | EX − 45 degrees | EX − 45 degrees | 0 degrees B555 + J529 B500 + Class 2 B500 + J529 | 0 degrees B555 + J529 B500 + Class 2 B500 + J529 | 0 degrees B555 + J529 B500 + Class 2 B500 + J529 | 0 degrees B555 + B555 + J529 | |
| 1.B. | 1.62 mm M80 @ 838 +/− 8 m/s | 45 degrees B555 + J529 | EX − 45 degrees | EX − 45 degrees | EX − 45 degrees B555 + J529 B500 + Class 2 B500 + J529 | 0 degrees B555 + J529 B500 + Class 2 B500 + J529 | 0 degrees B555 + J529 B500 + Class 2 B500 + J529 | 0 degrees B555 + B555 + J529 | |
| 1.C. | Higher threats | | | | ***4-21 B500 + Class 2 | EX | EX | | |
| | | | | | 2. Shrapnel | | | | |
| 2.A.1 | 9.5 mm ball bearing Rc 63 propelled by 50 kg of 75% Forcite at 3.0 metres | 3F5 B500 + J529 | EX | EX | 3F5 B500 + J529 | EX | EX | | |
| 2.A.2 | 9.5 mm ball bearing Rc 63 propelled by 50 kg of 75% Forcite at 5.0 metres | | | | | | 4-2 B500 + J529 B555 + J529 | | |
| 2.A.3 | 9.5 mm ball bearing Rc 63 propelled by ballistic test setup at 1435 m/s | | | | Yes B555 + J529 | Yes B555 + J529 | Yes B555 + J529 | Yes-1171 m/s B555 + B555 + J529 | |
| 2.B. | Fragments from 51 mm diameter steel pipe bomb propelled by 454 grams of smokeless powder at a stand off of 305 mm | | | | 4-17 B500 + J529 | 5-4 B555 + J529 | 5-2 B555 + J529 | | |
| | | | | | 3. Explosive Device in Contact | | | | |
| 3.A. | 51 mm diameter steel pipe bomb propelled by 454 grams of smokeless powder | 4-18 B500 + J529 | 5-3 B555 + J529 | 5-1 B555 + J529 | 3E1 B500 + J529 | 5-3 B555 + J529 | 5-1 B555 + J529 | | |
| 3.B. | M67 handgrenade | 4-6 B555 + J529 | EX | EX | EX | EX | EX | | |
| | | | | | 4. Non-Directional Charges | | | | |
| 4.A. | 2.3 kg @ 0.5 m | | | | 3E3 B500 + J529 | EX | EX | | |

TABLE 2-continued

| ID | | Roof RU | Roof RP | Roof RO | Door DU | Door DP | Door DO | Roof rail |
|---|---|---|---|---|---|---|---|---|
| | System: | | | | | | | |
| | Outer layer | High hard steel | High hard steel | High hard steel | High hard steel | High hard steel | High hard steel | High hard steel |
| | Bonder | Urethane bonder | Polysulphide bonder | No bonder | Urethane bonder | Polysulphide bonder | No bonder | No bonder |
| | Inner layer | Tough steel | Tough steel | Tough steel | Tough steel | Tough steel | Tough steel | High hard steel |
| | Innermost layer | | | | Spectra | Spectra | Spectra | Tough steel |
| | Threat | | | | | | | |
| 4.B. | 50 kg @ 3.0 m | | | | 3F5 B500 + J529 | | | |
| 4.C. | 50 kg @ 5.0 m | | | | | EX | EX | 4-1 @ 3.5 m B555 + B555 + J529 |
| | | | | | | | 4-2 B500 + J529 B555 + J529 | |

B555 = Sleeman Compass B555
B500 = Sanderson Kayser Bulloy 500
Class 2 = Sanderson Kayser Military Vehicles and Engineering Establishment (MVEE) specification 816 Class 2
529 = Jessop 529

TABLE 3

Mechanical Test Results

| Steel | Heat Lot | Hardness Rockwell "C" | Hardness Brinell | Ultimate Tensile Strength (MPa) | % Elongation | Fracture Toughness (J/mm) |
|---|---|---|---|---|---|---|
| High hard steels | | | | | | |
| Bulloy 500 | LV8103 | 51 (conversion) | 492 | 1667 | 13.8 | |
| Bulloy 500 | LV8150 | 50 | | 1564 | 13.7 | |
| Compass B555 | 468613-30 | 47 | | 1559 | 14.9 | 3.7–4.0 |
| Compass B555 | | 49.5 | | 1688 | 19.9 | 3.3–3.5 |
| Tough steels | | | | | | |
| MVEE Class 2 | LV8144 | 32 (conversion) | 302 | 1041 | 15.0 | 6.5* |
| Jessop 529 | OMW32HH | 30.5 | | 993 | 13.6 | 5.4–5.9 |
| Jessop 529 | | 36 | | 1101 | 17.2 | 3.6–3.8 |

*assuming that Sanderson Kayser used a 10 mm deep sample with a 2 mm deep notch when conducting impact tests. Their result was 0.81 J/mm2

---

Test No. 3E-1

TEST IDENTIFIERS

| | |
|---|---|
| Test Series | 3E |
| Site | Val des Monts |
| Date | 96-01-23 |

PROCEDURE

| | |
|---|---|
| Objective | To determine if 3 mm (⅛in.) of Sanderson Keyser Bulloy 500 steel bonded with urethane to 3 mm (⅛in.) of Jessop 529 steel and Backed with 4.9 kg/m2 (1.0 psf) of Spectrashield can be used as an armour system in an automotive door to provide protection against a contact detonated steel pipe bomb filled with 454 g (16 oz.) of smokeless powder |
| Charge Information | |
| Charge Type | Pipe bomb |
| Charge Weight | 454 g (16 oz.) |
| Charge Name | Smokeless powder |
| Charge Manufacturer | Bullseye |
| Charge Lot | |
| Pipe Size | 51 mm (2.0 in.) diameter steel |
| Stand Off | Contact |
| Charge Location | Door |
| Vehicle | Test Fixture |
| Armour Systems | |
| A-Armour Location 1 | RF Door |
| A-OEM Layer | mm (0.04 in.) mild steel |
| A-Outer Layer 1 | 3 mm (⅛in.) Sanderson Keyser Bulloy 500 steel |
| A-Bonder/Gap 1 | Urethane |
| A-Layer 2 | 3 mm (⅛in.) Jessop 529 steel |
| A-Bonder/Gap 2 | Nil |
| A-Layer 3 | 4.9 kg/m2 (1.0 psf) Spectrashield |
| A-Witness Panel | 1 mm (0.04 in.) aluminum |
| B-Armour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | Pipe bomb suspended against the door skin with its axis parallel to the vehicle's axis. Pipe located adjacent to the centre of the lower half of the door. Detonator inserted in end of pipe closest to the front of the vehicle. Door complete with glazing. |

-continued

| Test No. 3E-1 | |
|---|---|

OBSERVATIONS

| | |
|---|---|
| Survive | Yes |
| Electronic Data | |
| Internal Pressure (psi) | |
| External Pressure (psi) | |
| Lateral Acceleration (g) | |
| Vertical Acceleration (g) | |
| Armour Samples | |
| C-Armour Location 1 | RF Door |
| C-OBM Layer | 360 mm (14.0 in.) hole and bottom pulled away |
| C-Outer Layer 1 | Depressed but intact |
| C-Bonder/Gap 1 | |
| C-Layer 2 | Intact |
| C-Bonder/Gap 2 | |
| C-Layer 3 | Intact |
| C-Witness Panel | No marks |
| D-Armour Location 2 | RF Door Glazing |
| D-OEM Layer | |
| D-Outer Layer 1 | Triplex 45 mm (1.8 in.) glazing c/w polycarbonate |
| D-Bonder/Gap 1 | |
| D-Layer 2 | |
| D-Bonder/Gap 2 | |
| D-Layer 3 | |
| D-Witness Panel | |
| Recorded Visual Data | |
| High 8 mm | |
| 8 mm | |
| VHS | |
| SVHS | |
| High Speed Film | |
| High Speed Video | |
| Observation Notes | The door skin was pulled away from the door at the bottom. The pipe bomb pressed a portion of the door skin into the armour at the site of the depression. The depth of the depression at the conclusion of this test is not known, however, the door was subjected to three more tests and the depression eventually reached 79 mm (3.1 in.) (Refer to tests 3E2, 3G5 and 3G6). The door was basically intact. There were four lobes on the beltline bar in the door. The lobes were reinforced with gussets protruding right to the lower edge of the lobes. One of the lobes close to the site of impact pushed the inner layer of armour through the outer layer so that the outer layer had a semi-circular crack. This crack is not considered a system failure. The glazing was cracked but was still intact. |

CONCLUSIONS

| | |
|---|---|
| Conclusions | A vehicle occupant would not have been harmed by flying debris or mechanical failure. 3 mm (⅛in.) of Sanderson Keyser Bulloy 500 steel bonded with urethane to 3 mm (⅛in.) of Jessop 529 steel backed with 4.9 kg/m2 (1.0 psf Spectrashield) can be used as an armour system in an automotive door to provide protection against a contact detonated steel pipe bomb filled with 454 g (16 oz.) of smokeless powder. |

RECOMMENDATIONS

| | |
|---|---|
| Recommendations | 3 mm (⅛in.) of Sanderson Keyser Bulloy 500 steel bonded with urethane to 3 mm (⅛in.) of Jessop 529 steel backed with 4.9 kg/m2 (1.0 psf Spectrashield) should be used as an armour system in an automotive door to provide protection against a contact detonated steel pipe bomb filled with 454 g (16 oz.) of smokeless powder The gussets on the beltline bar lobes should be shortened to allow the lobes to hinge a bit. |

| | |
|---|---|
| | Test No. 3E-3 |

TEST IDENTIFIERS

| | |
|---|---|
| Test Series | 3E |
| Site | Val des Monts |
| Date | 96-01-23 |

PROCEDURE

| | |
|---|---|
| Objective | To determine if 3 mm (⅛ in.) of Sanderson Keyser Bulloy 500 steel bonded with urethane to 3 mm (⅛ in.) of Jessop 529 steel and backed with 4.9 kg/m2 (1.0 psf) of Spectrashield can be used as an armour system in an automotive door to provide protection against the shock and overpressure effects of a 2.27 kg (5.0 lb.) non-directional charge detonated at a distance of 0.5 m (20 in.). |
| Charge Information | |
| Charge Type | Non-directional |
| Charge Weight | 2.27 kg (5.0 lb.) |
| Charge Name | 75% Forcite dynamite |
| Charge Manufacturer | |
| Charge Lot | |
| Pipe Size | |
| Stand Off | 0.5 m (20 in.) |
| Charge Location | Door |
| Vehicle | Test Fixture |
| Armour Systems | |
| A-Armour Location 1 | RF Door |
| A-OEM Layer | 1 mm (0.04 in.) mild steel |
| A-Outer Layer 1 | 3 mm (⅛ in.) Sanderson Keyser Bulloy 500 steel |
| A-Bonder/Gap 1 | Urethane |
| A-Layer 2 | 3 mm (⅛ in.) Jessop 529 steel |
| A-Bonder/Gap 2 | Nil |
| A-Layer 3 | 4.9 kg/m2 (I.0 psf) Spectrashield |
| A-Witness Panel | 1 mm (0.04 in.) aluminum |
| B-Armour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | The charge was placed in the trunk of a vehicle which was placed so that the charge would impact the centre of the armoured door. An opening was placed in the trunk to further direct the charge to the armoured door |

OBSERVATIONS

| | |
|---|---|
| Survive | Yes |
| Electronic Data | |
| Internal Pressure (psi) | |
| External Pressure (psi) | |
| Lateral Acceleration (g) | |
| Vertical Acceleration (g) | |
| Armour Samples | |
| C-Armour Location 1 | RF Door |
| C-OEM Layer | Numerous impacts and penetrations |
| C-Outer Layer 1 | 58 mm (2.28 in.) depression - no penetrations |
| C-Bonder/Gap 1 | |
| C-Layer 2 | No penetrations or cracks, some depression |
| C-Bonder/Gap 2 | |
| C-Layer 3 | No penetrations |
| C-Witness Panel | No marks |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |

-continued

Test No. 3E-3

RecordedVisual Data

High 8 mm
VHS
SVHS
High Speed Film
High Speed Video

| | |
|---|---|
| Observation Notes | The door was intact. The door skin was pressed against the armour system and penetrated in many areas. The outer layer of armour was depressed 58 mm (2.28 in.) and had two areas of notable impact close to the centre of the door. These areas were circled in silver paint for future reference as the door would be retested. The two areas of impact were also visible on the inside of the second layer of steel. They were also marked with silver paint for future reference. The Spectra was not damaged although it had been impacted by the second layer of steel. |

CONCLUSIONS

| | |
|---|---|
| Conclusions | This system provides excellent protection against the threat of the shock and overpressure effects of a 2.27 kg (5.0 lb.) non-directional charge detonated at a distance of 0.5 m (20 in.) An occupant would not have been harmed by flying debris or mechanical failure. |

RECOMMENDATIONS

| | |
|---|---|
| Recommendations | If protection is required against the shock and overpressure effects of a 2.27 kg (5.0 lb.) non-directional charge detonated at a distance of 0.5 m (20 in.), 3 mm (⅛ in.) of Sanderson Keyser Bulloy 500 steel bonded with urethane to 3 mm (⅛ in.) of Jessop 529 steel should be used. |

Test No. 3F-5

TEST IDENTIFIERS

| | |
|---|---|
| Test Series | 3F |
| Site | Petawawa |
| Date | 96-04-11 |

PROCEDURE

| | |
|---|---|
| Objective | To determine if the door armour system could provide protection against the shock and overpressure of a 50 kg (110 pound) non-directional charge placed 3.0 m (10 feet) from the vehicle. Also, to determine if the armour system could prevent the penetration of steel ball bearings propelled by the same charge. |

Charge Information

| | |
|---|---|
| Charge Type | Non-directional with shrapnel |
| Charge Weight | 50 kg (110 pound) |
| Charge Name | 75% Forcite dynamite |
| Charge Manufacturer | |
| Charge Lot | |
| Pipe Size | |
| Stand Off | 3.0 m (10 feet) |
| Charge Location | Side |
| Vehicle | Test Fixture |

Armour Systems

| | |
|---|---|
| A-Armour Location 1 | RF Door |
| A-OEM Layer | 1 mm (0.04 inches) mild steel |
| A-Outer Layer 1 | 3 mm (⅛ inch) Sanderson Keyser Bulloy 500 |
| A-Bonder/Gap 1 | Urethane |
| A-Layer 2 | 3 mm (⅛ inch) Jessop 529 |
| A-Bonder/Gap 2 | Nil |
| A-Layer 3 | 4.9 kg/m2 (1.0 psf) Spectrashield |
| A-Witness Panel | 1 mm (0.038 inches) aluminum |
| B-Armour Location 2 | RF Door |
| B-O-OEM Layer | |
| B-Outer Layer 1 | Triplex 45 mm (1.77 inches) glazing s/n SG26842 |
| B-Bonder/Gap 1 | |
| B-Layer 2 | |
| B-Bonder/Gap 2 | |

-continued

| Test No. 3F-5 | |
|---|---|
| B-Layer 3 | |
| B-Witness Panel | Nil |
| Procedure Notes | The charge was placed in the trunk of a vehicle placed so that the charge was closest to the ""B"" pillar on the test fixture. The fender of this vehicle was cut open to expose the charge and preferentially direct it towards the test fixture. The ball bearings (63 Rockwell ""C"" scale) were taped to the exterior of the charge facing the test fixture. NOTE: This door was previously tested with a 2.3 kg (5.0 pound) non-directional charge, test no. 3E3. It had sustained a large depression in the outer layer 58 mm (2.28 inches) deep from the pressure and two smaller yet deeper depressions from shrapnel. These smaller depressions were marked with silver paint." |
| OBSERVATIONS | |
| Survive | No |
| Electronic Data | |
| Internal Pressure (psi) | |
| External Pressure (psi) | |
| Lateral Acceleration (g) | |
| Vertical Acceleration (g) | |
| Armour Samples | |
| C-Armour Location 1 | RF Door |
| C-OEM Layer | Intact but penetrated many times by shrapnel |
| C-Outer Layer 1 | Slight depression - one penetration |
| C-Bonder/Gap 1 | |
| C-Layer 2 | No penetrations |
| C-Bonder/Gap 2 | |
| C-Layer 3 | No penetrations |
| C-Witness Panel | No penetrations |
| D-Armour Location 2 | RF Door |
| D-OEM Layer | Pushed out of frame at top, inner layer intact |
| D-Outer Layer 1 | |
| D-Bonder/Gap 1 | |
| D-Layer 2 | |
| D-Bonder/Gap 2 | |
| D-Layer 3 | |
| D-Witness Panel | |
| RecordedVisual Data | |
| High 8 mm | |
| 8 mm | |
| VHS | |
| SVHS | |
| High Speed Film | |
| High Speed Video | |
| Observation Notes | The glazing was forced through the frame at the top and came to rest on the test fixture. The polycarbonate inner layer was not penetrated. The lower half of the door was impacted by at least 30 pieces of shrapnel including 6 ball bearings. The outer steel layer was penetrated by one ball bearing but it was stopped by the second steel layer, the Spectra was not required to stop this threat. The steel armour was depressed 76 mm (3.0 in.) in the center but maintained its structural integrity. |
| CONCLUSIONS | |
| Conclusions | The glazing frame needs to be reinforced. The lower half of the door performed well and completely defeated the non-directional and high hardness shrapnel threats, this system does not need further development. |
| RECOMMENDATIONS | |
| Recommendations | The three layer armour system can be used in the lower half of the door to defeat the shock and overpressure of a 50 kg (110 pound) non-directional charge placed 3.0 m (10 feet) away. It can also be used to defeat high hardness shrapnel propelled by the same charge. The glazing is sufficient for this threat but the frame system requires further development |

| Test No. 4-1 | |
|---|---|
| TEST IDENTIFIERS | |
| Test Series | 4 |
| Site | DREV |
| Date | |
| PROCEDURE | |
| Objective | To determine if the armour systems could provide protection against the shock and overpressure of a 50 kg (110 pound) non-directional charge placed 3.5 m (11.5 feet) from the vehicle. Also, to determine if the armour systems could prevent the penetration of steel ball bearings propelled by the same charge. |
| Charge Information | |
| Charge Type | Non-directional with shrapnel |
| Charge Weight | 50 kg (110 lb.) |
| Charge Name | 75% Forcite dynamite |
| Charge Manufacturer | |
| Charge Lot | |
| Pipe Size | |
| Stand Off | 3.5 m (11.5 feet) |
| Charge Location | Right Side |
| Vehicle | 1992 Roadmaster Full |
| Armour Systems | |
| A-Armour Location 1 | Right Side Roof Rail and Sail Panel |
| A-OEM Layer | 1 mm (0.04 in.) mild steel |
| A-Outer Layer 1 | 3 mm (⅛ in.) Compass B555 |
| A-Bonder/Gap 1 | Nil |
| A-Layer 2 | 3 mm (⅛ in.) Compass B555 |
| A-Bonder/Gap 2 | Nil |
| A-Layer 3 | 3 mm (⅛ in.) Jessop 529 steel |
| A-Witness Panel | Screen |
| B-Armour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | The charge was placed in the trunk of a vehicle that was positioned so that the centre of the charge would be directed at the ""B"" pillar of the armoured vehicle. The sides of the trunk were cut to further focus the charge on the armoured vehicle. 9.5 mm (⅜ in.) diameter ball bearings, 63 Rockwell ""C"" hardness, were taped to the side of the charge adjacent to the armoured vehicle." |
| OBSERVATIONS | |
| Survive | Yes |
| Electronic Data | |
| Internal Pressure (psi) | |
| External pressure (psi) | |
| Lateral Acceleration (g) | |
| Vertical Acceleration (g) | |
| Armour Samples | |
| C-Armour Location 1 | Right Side Roof Rail and Sail Panel |
| C-OEM Layer | Several perforations |
| C-Outer Layer 1 | Intact |
| C-Bonder/Gap 1 | |
| C-Layer 2 | Intact |
| C-Bonder/Gap 2 | |
| C-Layer 3 | Intact - no penetrations |
| C-Witness Panel | No penetrations |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |

-continued

| Test No. 4-1 | |
|---|---|
| Recorded Visual Data | |
| High 8mm | |
| 8 mm | |
| VHS | |
| SVHS | |
| High Speed Film | |
| High Speed Video | |
| Observation Notes | Several pieces of shrapnel impacted the sail panel but did not cause any penetrations into the vehicle. There weren't any impacts of ball bearings on the roof rail or sail panel that were located. The roof rail and sail panel appeared unchanged by the test. |
| CONCLUSIONS | |
| Conclusions | The three layer steel armour system is capable of providing protection against the shock and overpressure of a 50 kg (110 pound) non-directional charge placed 3.5 m (11.5 feet) from the vehicle and from shrapnel propelled by the same charge. |
| RECOMMENDATIONS | |
| Recommendations | This system is complete and may be used in its present configuration. No further testing required. |

| Test No. 4-2 | |
|---|---|
| TEST IDENTIFIERS | |
| Test Series | 4 |
| Site | DREV |
| Date | 96-07-04 |
| PROCEDURE | |
| Objective | To determine if the armour systems could provide protection against the shock and overpressure of a 50 kg (110 pound) non-directional charge placed 5.0 m (16.4 feet) from the vehicle. Also, to determine if the armour systems could prevent the penetration of steel ball bearings propelled by the same charge. |
| Charge Information | |
| Charge Type | Non-directional with shrapnel |
| Charge Weight | 50 kg (110 lb.) |
| Charge Name | 75% Forcite dynamite |
| Charge Manufacturer | |
| Charge Lot | |
| Pipe Size | |
| Stand Off | 5.0 m (16.4 feet) |
| Charge Location | Left Side |
| Vehicle | 1992 Roadmaster Full |
| Armour Systems | |
| A-Armour Location 1 | LF Door |
| A-OEM Layer | 1 mm (0.04 in.) mild steel |
| A-Outer Layer 1 | 3 mm (⅛ in.) Sanderson Keyser Bulloy 500 steel |
| A-Bonder/Gap 1 | Urethane |
| A-Layer 2 | 3 mm (⅛ in.) Jessop 529 steel |
| A-Bonder/Gap 2 | Nil |
| A-Layer 3 | 4.9 kg/m2 (I.0 psf) Spectrashield |
| A-Witness Panel | Screen |
| B-Armour Location 2 | Left Side ""B"" pillar" |
| B-O-OEM Layer | 1 mm (0.04 in.) mild steel |
| B-Outer Layer 1 | 3 mm (⅛ in.) Jessop 529 steel |
| B-Bonder/Gap 1 | 50 mm (2 in.) to 100 mm (4 in.) |
| B-Layer 2 | 3 mm (⅛ in.) Sanderson Keyser Bulloy 500 steel |
| B-Bonder/Gap 2 | Nil - plug welded together |
| B-Layer 3 | 3 mm (⅛ in.) Jessop 529 steel |
| B-Witness Panel | Screen |
| Procedure Notes | The charge was placed in the trunk of a vehicle that was positioned so that the centre of the charge would be directed at the ""B"" pillar of the armoured vehicle. The sides of the trunk were cut to further focus the charge on the armoured vehicle. 9.5 mm (⅜ in.) diameter ball bearings, 63 Rockwell ""C"" |

-continued

| Test No. 4-2 | |
|---|---|
| | hardness, were taped to the side of the charge adjacent to the armoured vehicle." |
| OBSERVATIONS | |
| Survive | Yes |
| Electronic Data | |
| Internal Pressure (psi) | |
| External Pressure (psi) | |
| Lateral Acceleration (g) | |
| Vertical Acceleration (g) | |
| Armour Samples | |
| C-Armour Location 1 | LF Door |
| C-OEM Layer | Numerous Impacts and penetrations |
| C-Outer Layer 1 | One ball bearing penetration |
| C-Bonder/Gap 1 | |
| C-Layer 2 | No penetrations |
| C-Bonder/Gap 2 | |
| C-Layer 3 | No penetrations |
| C-Witness Panel | No penetrations |
| D-Armour Location 2 | Left Side ""B"" pillar" |
| D-OEM Layer | Numerous impacts and penetrations |
| D-Outer Layer 1 | |
| D-Bonder/Gap 1 | |
| D-Layer 2 | No access to observe |
| D-Bonder/Gap 2 | |
| D-Layer 3 | No penetrations |
| D-Witness Panel | No penetrations |
| RecordedVisual Data | |
| High 8 mm | |
| 8 mm | |
| VHS | |
| SVHS | |
| High Speed Film | |
| High Speed Video | |
| Observation Notes | The vehicle basically remained intact although the sheet metal was pressed up against the armour systems. There were three discernable impacts of ball bearings on the front door. One of them penetrated the outer layer of steel and was trapped by the second layer of steel. The vehicle was moved sideways and rearward, the left rear wheel moved the most, 1.2 m (3.9 ft.) left and 0.5 m (1.6 ft.) to the rear. The armour systems did not seem to be affected by the over pressure. |
| CONCLUSIONS | |
| Conclusions | The armour systems provided complete protection against the shock and over pressure of the 50 kg (110 lb.) non-directional charge when detonated at a distance of 5.0 m (16.4 ft.). The armour systems also prevented the high hardness shrapnel from entering the vehicle. |
| RECOMMENDATIONS | |
| Recommendations | These armour systems should be used if protection is required against the shock and over pressure of a 50 kg (110 lb.) non-directional charge when detonated at a distance of 5.0 m (16.4 ft.). |

| Test No. 4-6 | |
|---|---|
| TEST IDENTIFIERS | |
| Test Series | 4 |
| Site | DREV |
| Date | 96-07-03 |
| PROCEDURE | |
| Objective | To determine if 3 mm (⅛ inch) of Compass B555 steel bonded with urethane to 3 mm (⅛ inch) of Jessop 529 steel could be employed as roof armour to stop the threat of a M67 grenade when detonated in contact with the roof pan. |

-continued

| Test No. 4-6 | |
|---|---|
| Charge Information | |
| Charge Type | Hand grenade M67 fragmentation |
| Charge Weight | 185 grams (6.5 ounces) |
| Charge Name | Composition ""B"" |
| Charge Manufacturer | |
| Charge Lot | |
| Pipe Size | |
| Stand Off | Contact |
| Charge Location | Roof |
| Vehicle | 1992 Roadmaster Full |
| Armour Systems | |
| A-Armour Location 1 | Roof over RR passenger |
| A-OEM Layer | 1 mm (0.04 in.) mild steel |
| A-Outer Layer 1 | 3 mm (⅛ inch) of Compass B555 steel |
| A-Bonder/Gap 1 | Urethane |
| A-Layer 2 | 3 mm (⅛ inch) of Jessop 529 steel |
| A-Bonder/Gap 2 | |
| A-Layer 3 | |
| A-Witness Panel | DREV standard witness pack |
| B-Amour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | The grenade was placed on the roof in the centre right rear quadrant with the fuse facing upward. A witness pack was suspended 127 mm (5.0 in.) below the roof. |
| OBSERVATIONS | |
| Survive | Yes |
| Electronic Data | |
| Internal Pressure (psi) | |
| External Pressure (psi) | |
| Lateral Acceleration (g) | |
| Vertical Acceleration (g) | |
| Armour Samples | |
| C-Armour Location 1 | Roof over RR passenger |
| C-OEM Layer | One large penetration |
| C-Outer Layer 1 | Depression - no penetration |
| C-Bonder/Gap 1 | |
| C-Layer 2 | Depression - no penetration |
| C-Bonder/Gap 2 | |
| C-Layer 3 | |
| C-Witness Panel | No marks |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |
| RecordedVisual Data | |
| High 8 mm | |
| 8 mm | |
| VHS | |
| SVHS | |
| High Speed Film | |
| High Speed Video | |
| Observation Notes | The outer layer was depressed approximately 140 mm (5.5 in.) in diameter and 26 mm (1.0 inch) deep at the centre. At the bottom of the depression was an ""H"" shaped crack. The inner layer was not ruptured or cracked but was depressed approximately 25.4 mm (1.0 inch)." |

-continued

| Test No. 4-6 | |
|---|---|
| CONCLUSIONS | |
| Conclusions | 3 mm (⅛ inch) of Compass B555 steel bonded with urethane to 3 mm (⅛ inch) of Jessop 529 steel and employed as roof armour will stop the threat of a M67 grenade when detonated in contact with the roof pan. |
| RECOMMENDATIONS | |
| Recommendations | If protection in the roof (or other areas) is required against the M67 grenade when detonated in contact, the armour system should be comprised of 3 mm (⅛ inch) of Compass B555 steel bonded with urethane to 3 mm (⅛ inch) of Jessop 529 steel. |

| Test No. 4-17 | |
|---|---|
| TEST IDENTIFIERS | |
| Test Series | 4 |
| Site | DREV |
| Date | 98-07-03 |
| PROCEDURE | |
| Objective | To determine if 3 mm (⅛ in.) of Sanderson Keyser Bulloy 500 steel bonded with urethane to 3 mm (⅛ in.) of Jessop 529 steel and backed with 4.9 kg/m2 (1.0 psf) Spectrashield could prevent the penetration of the shrapnel created by a pipe bomb filled with 454 g (16 oz.) of smokeless powder detonated 305 mm (12 in.) from the armour. |
| Charge Information | |
| Charge Type | Pipe bomb |
| Charge Weight | 454 g (16 oz.) |
| Charge Name | Smokeless powder |
| Charge Manufacturer | Winchester 231 |
| Charge Lot | |
| Pipe Size | 51 mm (2.0 in.) diameter steel |
| Stand Off | 305 mm (12 in.) |
| Charge Location | Door |
| Vehicle | 1992 Roadmaster Full |
| Armour Systems | |
| A-Armour Location 1 | RF Door |
| A-OEM Layer | 1 mm (0.04 in.) mild steel |
| A-Outer Layer 1 | 3 mm (⅛ in.) Sanderson Keyser Bulloy 500 steel |
| A-Bonder/Gap 1 | Urethane |
| A-Layer 2 | 3 mm (⅛ in.) of Jessop 529 steel |
| A-Bonder/Gap 2 | Nil |
| A-Layer 3 | 4.9 kg/m2 (I.0 psf) Spectrashield |
| A-Witness Panel | Screen |
| B-Armour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | The pipe bomb was hung on a frame so that its longitudinal axis was parallel to that of the vehicle and the bomb was 305 mm (12 in.) from the center of the lower half of the door. NOTE: This door had already been tested in test no. 4-1. There was a 15 mm (0.6 in.) penetration of the two steel layers but not the Spectrashield prior to test 4-17. |
| OBSERVATIONS | |
| Survive | Yes |
| Electronic Data | |
| Internal Pressure (psi) | |
| External Pressure (psi) | |
| Lateral Acceleration (g) | |
| Vertical Acceleration (g) | |

-continued

| Test No. 4-17 | |
|---|---|
| Armour Samples | |
| C-Armour Location 1 | RF Door |
| C-OEM Layer | Large number of penetrations |
| C-Outer Layer 1 | Split 16 mm (0.6 in.) by 178 mm (7.0 in.) |
| C-Bonder/Gap 1 | |
| C-Layer 2 | Split as per Outer Layer 1 |
| C-Bonder/Gap 2 | |
| C-Layer 3 | Impacted by one piece of shrapnel, no penetration |
| C-Witness Panel | No penetrations |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |
| Recorded Visual Data | |
| High 8 mm | |
| 8mm | |
| VHS | |
| SVHS | |
| High Speed Film | |
| High Speed Video | |
| Observation Notes | The pipe bomb broke into pieces with a wide range of sizes. The most significant impact was made by the largest piece that split the two steel layers. The Spectrashield did not allow the fragments to enter the vehicle. |
| CONCLUSIONS | |
| Conclusions | 3 mm (⅛ in.) of Sanderson Keyser Bulloy 500 steel bonded with urethane to 3 mm (⅛ in.) of Jessop 529 steel backed with 4.9 kg/m2 (1.0 psf) Spectrashield can prevent the penetration of the shrapnel created by a pipe bomb filled with 454 g (16 oz.) of smokeless powder detonated 305 mm (12 in.) from the armour. |
| RECOMMENDATIONS | |
| Recommendations | 3 mm (⅛ in.) of Sanderson Keyser Bulloy 500 steel bonded with urethane to 3 mm (⅛ in.) of Jessop 529 steel backed with 4.9 kg/m2 (1.0 psf) Spectrashield can be used to prevent the penetration of the shrapnel created by a pipe bomb filled with 454 g (16 oz) of smokeless powder detonated 305 mm (12 in.) from the armour. |

| Test No. 4-18 | |
|---|---|
| TEST IDENTIFIERS | |
| Test Series | 4 |
| Site | Val des Monts |
| Date | 98-07-11 |
| PROCEDURE | |
| Objective | To determine if 3 mm (⅛ inch) of Sanderson Keyser Bulloy 500 steel bonded with urethane to 3 mm (⅛ inch) of Jessop 529 steel steel can defeat a pipe bomb placed in contact. |
| Charge information | |
| Charge Type | Pipe bomb |
| Charge Weight | 454 g (16 ounces) |
| Charge Name | Red Dot smokeless powder |
| Charge Manufacturer | |
| Charge Lot | |
| Pipe Size | 51 mm (2.0 in.) diameter steel |
| Stand Off | Contact |
| Charge Location | Roof |
| Vehicle | Test Fixture |

-continued

| Test No. 4-18 | |
|---|---|
| Armour Systems | |
| A-Armour Location 1 | Roof |
| A-OEM Layer | 1 mm (0.04 in.) mild steel |
| A-Outer Layer 1 | 3 mm (⅛ inch) Sanderson Keyser Bulloy 500 steel |
| A-Bonder/Gap 1 | Urethane |
| A-Layer 2 | 3 mm (⅛ inch) of Jessop 529 steel |
| A-Bonder/Gap 2 | |
| A-Layer 3 | |
| A-Witness Panel | 1 mm (0.04 inches) aluminum |
| B-Armour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | Pipe bomb was placed directly on sheet steel over the center of the test panel (12 mm (0.5 inch) gap between sheet steel and armour). Pipe facing front to back on vehicle with detonator at the front. The outer layer of steel was bolted directly to the test fixture using washers welded to the steel (over holes in the armour). The inner armour was continuously welded around the edges to the outer armour with the exception of cut-outs where the bolts passed through the armour. |
| OBSERVATIONS | |
| Survive | Yes |
| Electronic Data | |
| Internal Pressure (psi) | |
| External Pressure (psi) | |
| Lateral Acceleration (g) | |
| Vertical Acceleration (g) | |
| Armour Samples | |
| C-Armour Location 1 | Roof |
| C-OEM Layer | Removed in area of pipe bomb |
| C-Outer Layer 1 | Depressed but intact |
| C-Bonder/Gap 1 | |
| C-Layer 2 | Depressed but intact |
| C-Bonder/Gap 2 | |
| C-Layer 3 | |
| C-Witness Panel | No penetrations |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |
| RecordedVisual Data | |
| High 8 mm | |
| 8 mm | |
| VHS | |
| SVHS | |
| High Speed Film | |
| High Speed Video | |
| Observation Notes | The two layers of armour were depressed but not cracked or penetrated. The inner layer of armour was depressed 63 mm (2.5 inches). |
| CONCLUSIONS | |
| Conclusions | The combination of 3 mm (⅛ inch) Sanderson Keyser Bulloy 500 steel bonded with urethane to 3 mm (⅛ inch) of Jessop 529 steel can defeat a pipe bomb placed in contact when the layers of steel are continuous. |
| RECOMMENDATIONS | |
| Recommendations | The combination of 3 mm (⅛ inch) Sanderson Keyser Bulloy 500 steel bonded with urethane to 3 mm (⅛ inch) of Jessop 529 steel can be used to defeat pipe bombs filled with 454 g (16 oz.) of smokeless powder when detonated in contact. |

| | Test No. 4-21 |
|---|---|
| TEST IDENTIFIERS | |
| Test Series | 4 |
| Site | Val des Monts |
| Date | 98-08-26 |
| PROCEDURE | |
| Objective | To determine if the application of ceramic armour to the exterior of the door armour system would degrade the armour system's ability to withstand attack from explosive charges, particularly the pipe bomb. |
| Charge Information | |
| Charge Type | Pipe bomb |
| Charge Weight | 454 g (16 oz.) |
| Charge Name | Smokeless powder |
| Charge Manufacturer | Hercules Bullseye |
| Charge Lot | |
| Pipe Size | 51 mm (2.0 in.) diameter steel |
| Stand Off | Contact |
| Charge Location | Door |
| Vehicle | 1992 Roadmaster Full |
| Armour Systems | |
| A-Armour Location 1 | RF Door |
| A-OEM Layer | 1 mm (0.04 inches) mild steel |
| A-Outer Layer 1 | 3 mm (⅛ inch) Sanderson Keyser Bulloy 500 |
| A-Bonder/Gap 1 | Urethane |
| A-Layer 2 | 3 mm (⅛ inch) Sanderson Keyser MVEE Class 2 |
| A-Bonder/Gap 2 | Nil |
| A-Layer 3 | 4.9 kg/m2 (I.0 psf Spectrashield |
| A-Witness Panel | Black cloth |
| B-Armour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | Ceramic panel was composed of outer layer of 1 mm (0.04 in.) cold rolled steel, middle layer of 7.7 mm (0.30 inches) of ceramic and inner layer of 1 mm (0.04 in.) cold rolled steel. A hole was cut in the OEM sheet steel, the ceramic panel was placed on the exterior of the door and the pipe bomb was placed in direct contact (in the center of the lower half of the door). NOTE: This door had been previously tested with the same charge and with small arms fire - test no. 3D1. |
| OBSERVATIONS | |
| Survive | Yes |
| Electronic Data | |
| Internal Pressure (psi) | |
| External Pressure (psi) | |
| Lateral Acceleration (g) | |
| Vertical Acceleration (g) | |
| Armour Samples | |
| C-Armour Location 1 | |
| C-OEM Layer | Completely removed |
| C-Outer Layer 1 | Cracked but not penetrated |
| C-Bonder/Gap 1 | |
| C-Layer 2 | No access to observe |
| C-Bonder/Gap 2 | |
| C-Layer 3 | Intact |
| C-Witness Panel | No penetrations |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |

-continued

| Test No. 4-21 | |
|---|---|
| RecordedVisual Data | |
| High 8 mm | |
| 8 mm | |
| VHS | |
| SVHS | |
| High Speed Film | |
| High Speed Video | |
| Observation Notes | The ceramic armour package was heavily damaged and broken up. However, the fragmentation from the ceramic armour did not pose a threat to the steel armour package. The outer layer of the steel armour package cracked in a ""Z"" shape but maintained its structural integrity." |
| CONCLUSIONS | |
| Conclusions | The application of a ceramic armour package to the base armour did not degrade the protection offered by the base armour when faced with a pipe bomb detonated in contact. |
| RECOMMENDATIONS | |
| Recommendations | Ceramic applique armour packages can be used to enhance the ballistic capability of the base armour package without fear of degrading the explosive resistance. |

| Test No. 5-1 | |
|---|---|
| TEST IDENTIFIERS | |
| Test Series | 5 |
| Site | Val des Monts |
| Date | 98-01-22 |
| PROCEDURE | |
| Objective | To determine if 3 mm (⅛ in.) of Compass B555 steel, placed against but not bonded to, 3 mm (⅛ in.) of Jessop 529 steel and backed with 9 kg/m2 (I.0 psf) Spectrashield can be used as an armour system in an automotive door to provide protection against a contact detonated steel pipe bomb filled with 454 g (16 oz.) of smokeless powder. |
| Charge Information | |
| Charge Type | Pipe bomb |
| Charge Weight | 454 g (16 oz.) |
| Charge Name | Smokeless powder |
| Charge Manufacturer | Red Dot |
| Charge Lot | |
| Pipe Size | 51 mm (2.0 in.) diameter steel |
| Stand Off | Contact |
| Charge Location | Door |
| Vehicle | 1992 Roadmaster Full |
| Armour Systems | |
| A-Armour Location 1 | RF Door |
| A-OEM Layer | 1 mm (0.04 in.) mild steel |
| A-Outer Layer 1 | 3 mm (⅛ in.) of Compass B555 steel |
| A-Bonder/Gap 1 | Nil |
| A-Layer 2 | 3 mm (⅛ in.) of Jessop 529 steel |
| A-Bonder/Gap 2 | Nil |
| A-Layer 3 | 4.9 kg/m2 (I.0 psf) Spectrashield |
| A-Witness Panel | Screen |
| B-Armour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | Pipe bomb suspended against the door skin with its axis parallel to the vehicle's axis. Pipe located so that it was adjacent to the centre of the lower half of the door. Detonator inserted in end of pipe closest to the front of the vehicle. |

-continued

| Test No. 5-1 | |
|---|---|
| OBSERVATIONS | |
| Survive Electronic Data | Yes |
| Internal Pressure (psi) | |
| External Pressure (psi) | |
| Lateral Acceleration (g) | |
| Vertical Acceleration (g) | |
| Armour Samples | |
| C-Armour Location 1 | RF Door |
| C-OEM Layer | One-third missing and bottom pulled out |
| C-Outer Layer 1 | Depressed 71 mm (2.8 in.), no penetrations |
| C-Bonder/Gap 1 | |
| C-Layer 2 | No access to observe |
| C-Bonder/Gap 2 | |
| C-Layer 3 | No penetrations |
| C-Witness Panel | No penetrations |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |
| Recorded Visual Data | |
| High 8 mm | |
| 8 mm | |
| VHS | |
| SVHS | |
| High Speed Film | |
| High Speed Video | |
| Observation Notes | The door skin was badly damaged and pulled out at the bottom. The armour system was intact with a 71 mm (2.8 in.) depression in the centre. The interior of the door was intact but pushed in 15 mm (0.6 in.). |
| CONCLUSIONS | |
| Conclusions | The combination of 3 mm (⅛ in.) of Compass B555 steel, placed against but not bonded to 3 mm (⅛ in.) of Jessop 529 steel and backed with 4.9 kg/m2 (I.0 psf) Spectrashield installed in an automotive door provided protection against a contact detonated steel pipe bomb filled with 454 g (16 oz.) of smokeless powder. |
| RECOMMENDATIONS | |
| Recommendations | This system could be employed where protection against a contact detonated steel pipe bomb filled with 454 g (16 oz.) of smokeless powder is required. |

| Test No. 5-2 | |
|---|---|
| TEST IDENTIFIERS | |
| Test Series | 5 |
| Site | Val des Monts |
| Date | 98-01-22 |
| PROCEDURE | |
| Objective | To determine if 3 mm (⅛ in.) of Compass B555 steel, placed against but not bonded to 3 mm (⅛ in.) of Jessop 529 steel and backed with 4.9 kg/m2 (I.0 psf) Spectrashield can be used as an armour system in an automotive door to provide protection against the fragments generated by a steel pipe bomb filled with 454 g (16 oz.) of smokeless powder at a stand-off of 305 mm (12.0 in.). |

-continued

Test No. 5-2

Charge Information

| | |
|---|---|
| Charge Type | Pipe bomb |
| Charge Weight | 454 g (16 oz.) |
| Charge Name | Smokeless powder |
| Charge Manufacturer | Red Dot |
| Charge Lot | |
| Pipe Size | 51 mm (2.0 in.) diameter steel |
| Stand Off | 305 mm (12.0 in.) |
| Charge Location | Door |
| Vehicle | 1992 Roadmaster Full |
| Armour Systems | |
| A-Armour Location 1 | RF Door |
| A-OEM Layer | Nil |
| A-Outer Layer 1 | 3 mm (⅛ in.) of Compass B555 steel |
| A-Bonder/Gap 1 | Nil |
| A-Layer 2 | 3 mm (⅛ in.) of Jessop 529 steel |
| A-Bonder/Gap 2 | Nil |
| A-Layer 3 | 4.9 kg/m2 (I.0 psf) Spectrashield |
| A-Witness Panel | Screen |
| B-Armour Location 2 | |
| B-O-OEM Layer | |
| H-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | This was the same door used in test no. 5-1. It was not repaired or modified after that test with the exception of the removal of the remainder of the door skin. The pipe bomb was suspended from a frame so that its axis was parallel to the vehicle's axis and the bomb was 305 mm (12.0 in.) from the centre of the lower half of the door. The detonator was inserted in the end of the pipe closest to the front of the vehicle. |
| OBSERVATIONS | |
| Survive | Yes |
| Electronic Data | |
| Internal Pressure (psi) | |
| External Pressure (psi) | |
| Lateral Acceleration (g) | |
| Vertical Acceleration (g) | |
| Armour Samples | |
| C-Armour Location 1 | RF Door |
| C-OEM Layer | |
| C-Outer Layer 1 | Large indentations, some tensile failures |
| C-Bonder/Gap 1 | |
| C-Layer 2 | No penetrations |
| C-Bonder/Gap 2 | |
| C-Layer 3 | Intact, no penetrations |
| C-Witness Panel | No penetrations |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |
| RecordedVisual Data | |
| High 8 mm | |
| 8 mm | |
| VHS | |
| SVHS | |
| High Speed Film | |
| High Speed Video | |
| Observation Notes | There was a pattern of large indentations in the outer layer that appeared to be made by strips of material from the pipe bomb that hit the door ""flat on"" verses ""edge on"". These strips appeared to be from 12 to 25 mm (0.5 to 1.0 in.) wide and 51 to 203 mm (2.0 to 8.0 in.) long. some of the indentations were severe enough to cause tensile failures leaving slits 1.6 to 3.2 |

-continued

Test No. 5-2

| | |
|---|---|
| | mm (¹⁄₁₆ to ⅛ in.) wide. There were several areas where the threads from the pipe caps left impressions in the outer layer. The interior of the door was basically unchanged as a result of the test." |
| CONCLUSIONS | |
| Conclusions | A vehicle occupant would not have been harmed by the effects of the fragments impacting the door. |
| RECOMMENDATIONS | |
| Recommendations | When protection against the fragments generated by a steel pipe bomb filled with 454 g (16 oz.) of smokeless powder at a stand-off of 305 mm (12.0 in.) is required, the combination of 3 mm (⅛ in.) of Compass B555 steel, placed against but not bonded to, 3 mm (⅛ in.) of Jessop 529 steel and backed with 4.9 kg/m2 (I.0 psf) Spectrashield can be used. |

Test No. 5-3

| | |
|---|---|
| TEST IDENTIFIERS | |
| Test Series | 5 |
| Site | Val des Monts |
| Date | 98-01-23 |
| PROCEDURE | |
| Objective | To determine if 3 mm (⅛ in.) of Compass B555 steel bonded with polysulphide to 3 mm (⅛ in.) of Jessop 529 steel and backed with 4.9 kg/m2 (I.0 psf) Spectrashield can be used as an armour system in an automotive door to provide protection against a contact detonated steel pipe bomb filled with 454 g (16 oz.) of smokeless powder. |
| Charge Information | |
| Charge Type | Pipe bomb |
| Charge Weight | 454 g (16 oz.) |
| Charge Name | Smokeless powder |
| Charge Manufacturer | Red Dot |
| Charge Lot | |
| Pipe Size | 51 mm (2.0 in.) diameter steel |
| Stand Off | Contact |
| Charge Location | Door |
| Vehicle | 1992 Roadmaster Full |
| Armour Systems | |
| A-Armour Location 1 | RF Door |
| A-OEM Layer | 1 mm (0.04 in.) mild steel |
| A-Outer Layer 1 | 3 mm (⅛ in.) of Compass B555 steel |
| A-Bonder/Gap 1 | Polysulphide |
| A-Layer 2 | 3 mm (⅛ in.) of Jessop 529 steel |
| A-Bonder/Gap 2 | Nil |
| A-Layer 3 | 4.9 kg/m2 (I.0 psf) Spectrashield |
| A-Witness Panel | Screen |
| B-Armour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B-Witness Panel | |
| Procedure Notes | Pipe bomb suspended against the door skin with its axis parallel to the vehicle's axis. Pipe located so that it was adjacent to the centre of the lower half of the door. Detonator inserted in end of pipe closest to the front of the vehicle. |
| OBSERVATIONS | |
| Survive | Yes |
| Electronic Data | |
| Internal Pressure (psi) | |
| External Pressure (psi) | |

-continued

| Test No. 5-3 | |
|---|---|
| Lateral Acceleration (g) | |
| Vertical Acceleration (g) | |
| Armour Samples | |
| C-Armour Location 1 | RF Door |
| C-OEM Layer | One-third missing, pulled out at bottom |
| C-Outer Layer 1 | Depressed 57 mm (2.2 in.), no cracks |
| C-Bonder/Gap 1 | |
| C-Layer 2 | No access to observe |
| C-Bonder/Gap 2 | |
| C-Layer 3 | Intact, no penetrations |
| C-Witness Panel | No penetrations |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |
| Recorded Visual Data | |
| High 8 mm | |
| 8 mm | |
| VHS | |
| SVHS | |
| High Speed Film | |
| High Speed Video | |
| Observation Notes | The door skin was badly damaged and pulled out at the bottom. The armour system was intact with a 57 mm (2.2 in.) depression in the centre. The interior of the door was intact. |
| CONCLUSIONS | |
| Conclusions | A vehicle occupant would not have been harmed by any material impacting or penetrating the door. |
| RECOMMENDATIONS | |
| Recommendations | If protection against a contact detonated steel pipe bomb filled with 454 g (16 oz.) of smokeless powder is required, 3 mm (⅛ in.) of Compass B555 steel bonded with polysulphide to 3 mm (⅛ in.) of Jessop 529 steel and backed with 4.9 kg/m2 (I.0 psf) Spectrashield can be used. |

| Test No. 5-4 | |
|---|---|
| TEST IDENTIFIERS | |
| Test Series | 5 |
| Site | Val des Monts |
| Date | 98-01-23 |
| PROCEDURE | |
| Objective | To determine if 3 mm (⅛ in.) of Compass B555 steel bonded with polysulphide to 3 mm (⅛ in.) of Jessop 529 steel and backed with 4.9 kg/m2 (I.0 psf) Spectrashield can be used as an armour system in an automotive door to provide protection against the fragments generated by a steel pipe bomb filled with 454 g (16 oz.) of smokeless powder at a stand-off of 305 mm (12.0 in.). |
| Charge Information | |
| Charge Type | Pipe bomb |
| Charge Weight | 454 g (16 oz.) |
| Charge Name | Smokeless powder |
| Charge Manufacturer | Red Dot |
| Charge Lot | |
| Pipe Size | 51 mm (2.0 in.) diameter steel |
| Stand Off | 305 mm (12.0 in.) |
| Charge Location | Door |
| Vehicle | 1992 Roadmaster Full |

-continued

| Test No. 5-4 | |
|---|---|
| Armour Systems | |
| Armour Location 1 | RF Door |
| A-OEM Layer | Nil |
| A-Outer Layer 1 | 3 mm (⅛ in.) of Compass B555 steel |
| A-Bonder/Gap 1 | Polysulphide |
| A-Layer 2 | 3 mm (⅛ in.) of Jessop 529 steel |
| A-Bonder/Gap 2 | Nil |
| A-Layer 3 | 4.9 kg/m2 (I.0 psf) Spectrashield |
| A-Witness Panel | Screen |
| B-Armour Location 2 | |
| B-O-OEM Layer | |
| B-Outer Layer 1 | |
| B-Bonder/Gap 1 | |
| B-Layer 2 | |
| B-Bonder/Gap 2 | |
| B-Layer 3 | |
| B Witness Panel | |
| Procedure Notes | This was the same door used in test no. 5-3. It was not repaired or modified after that test with the exception of the removal of the remainder of the door skin. The pipe bomb was suspended from a frame so that its axis was parallel to the vehicle's axis and the bomb was 305 mm (12.0 in.) from the centre of the lower half of the door. The detonator was inserted in the end of the pipe closest to the front of the vehicle. |
| OBSERVATIONS | |
| Survive | Yes |
| Electronic Data | |
| Internal Pressure (psi) | |
| External Pressure (psi) | |
| Lateral Acceleration (g) | |
| Vertical Acceleration (g) | |
| Armour Samples | |
| C-Armour Location 1 | RF Door |
| C-OEM Layer | |
| C-Outer Layer 1 | Large indentations, no cracks |
| C-Bonder/Gap 1 | |
| C-Layer 2 | No access to observe |
| C-Bonder/Gap 2 | |
| C-Layer 3 | Intact, no penetrations |
| C-Witness Panel | No penetrations |
| D-Armour Location 2 | |
| D-OEM Layer | |
| D-Outer Layer 1 | |
| D-Bonder/Gap 1 | |
| D-Layer 2 | |
| D-Bonder/Gap 2 | |
| D-Layer 3 | |
| D-Witness Panel | |
| RecordedVisual Data | |
| High 8 mm | |
| 8 mm | |
| VHS | |
| SVHS | |
| High Speed Film | |
| High Speed Video | |
| Observation Notes | There was a pattern of large indentations in the outer layer that appeared to be made by strips of material from the pipe bomb that hit the door ""flat on"" verses ""edge on"". These strips appeared to be from 12 to 25 mm (0.5 to 1.0 in.) wide and 51 to 203 mm (2.0 to 8.0 in.) long. The indentations were not severe enough to cause tensile failures or cracking in the outer layer. There were several areas where the threads from the pipe caps left impressions in the outer layer. The interior of the door was basically unchanged as a result of the test." |
| CONCLUSIONS | |
| Conclusions | This armour system defeated the fragment threat from a steel pipe bomb filled with 454 g (16 oz.) of smokeless powder detonated at a stand-off of 305 mm (12.0 in.). |

-continued

Test No. 5-4

RECOMMENDATIONS

Recommendations	The combination of 3 mm (⅛ in.) of Compass B555 steel bonded with polysulphide to 3 mm (⅛ in.) of Jessop 529 steel and backed with 4.9 kg/m2 (I.0 psf) Spectrashield can be used as an armour system in an automotive door to provide protection against the fragments generated by a steel pipe bomb filled with 454 g (16 oz.) of smokeless powder at a stand-off of 305 mm (12.0 in.).

What is claimed is:

1. A composite armor material comprising, an outer ballistic impact resistant, layer of a steel material having a Rockwell "C" scale hardness of 47–54, and an inner blast resistant steel layer having a fracture toughness of 3.6–6.5 J/mm and a Rockwell "C" scale hardness of 28–36, wherein the inner and outer layers are bonded together.

2. A material according to claim 1, wherein the inner and outer layers are bonded together with a synthetic resin bonder between the inner and outer layers.

3. A material according to claim 2, wherein the bonder is a polysulfide-based material having a tensile strength of >1.38 Mpa.

4. A material according to claim 2, wherein the bonder is a polyurethane-based material having a tensile strength of >6.89 Mpa.

5. A material according to claim 1, further comprising a layer of a composite of high tensile fibers laminated together with a ductile polymer binder, held in place adjacent to the inner layer by mechanical fasteners, such that in use the material will stretch to trap shrapnel which penetrates the inner layer.

6. A material according to claim 5, wherein the composite has an aerial density of about 4.9 kg/m$^2$.

7. A material according to claim 1, further comprising an outermost layer of a ballistic impact resistant steel material having a Rockwell C hardness of 47–54, wherein the layers are held together by welding.

8. A material according to claim 1, further comprising an outermost layer of a composite applique material, said applique material comprising two layers of mild steel, sandwiching a middle layer of ceramic tiles bonded in place by an adhesive.

9. A material according to claim 1, wherein the outer ballistic steel layer has a Rockwell "C" scale hardness of 49–51, and the inner impact resistant steel has a Rockwell "C" scale hardness of 28–30 and a fracture toughness of 5.4–6.5 J/mm.

\* \* \* \* \*